US007159902B2

(12) United States Patent
Carty

(10) Patent No.: US 7,159,902 B2
(45) Date of Patent: Jan. 9, 2007

(54) VEHICLE BED LINER APPARATUS CONTAINING A COMPARTMENTED BALLAST CHAMBER

(76) Inventor: Marty J. Carty, 75 Barleycorn Dr., Sunbury, OH (US) 43074

( * ) Notice: Subject to any disclaimer, the term of this patent is extended or adjusted under 35 U.S.C. 154(b) by 316 days.

(21) Appl. No.: 10/733,624

(22) Filed: Dec. 11, 2003

(65) Prior Publication Data

US 2004/0119274 A1 Jun. 24, 2004

Related U.S. Application Data

(60) Provisional application No. 60/434,225, filed on Dec. 17, 2002.

(51) Int. Cl.
*B62D 105/00* (2006.01)
(52) U.S. Cl. ............ 280/759; 224/403; 296/39.2
(58) Field of Classification Search ............ 280/759, 280/758; 224/402, 403, 404; 296/37.6, 296/39.2
See application file for complete search history.

(56) References Cited

U.S. PATENT DOCUMENTS

| 4,596,573 A | * | 6/1986 | Donnan et al. ............ 604/415 |
| 4,796,914 A | | 1/1989 | Raynor |
| 5,080,418 A | * | 1/1992 | Semple et al. ............ 296/39.2 |
| 5,542,765 A | * | 8/1996 | Smith et al. ............ 383/17 |
| 5,657,916 A | * | 8/1997 | Tackett ............ 224/404 |
| 5,779,092 A | * | 7/1998 | Hehn et al. ............ 220/563 |
| 5,897,138 A | * | 4/1999 | Hall ............ 280/759 |
| 6,027,139 A | * | 2/2000 | Malinowski et al. ....... 280/759 |
| 2002/0145277 A1 | * | 10/2002 | Dombey ............ 280/759 |
| 2004/0227338 A1 | * | 11/2004 | Ryan et al. ............ 280/759 |

* cited by examiner

*Primary Examiner*—Paul N. Dickson
*Assistant Examiner*—Leonard McCreary, Jr.

(57) ABSTRACT

A vehicle bed liner apparatus includes a peripherally sealed flexible top wall and flexible bottom wall for containing a quantity of ballast liquid, e.g. water. Compartment boundary means are located at plural internal non-peripheral regions between the flexible top wall and the flexible bottom wall. The compartment boundary means are in contact with the flexible top wall and the flexible bottom wall. The compartment boundary means define internal compartment boundaries. The plural non-peripheral compartment boundaries and plural internal non-peripheral regions between the flexible top wall and the flexible bottom wall that are not in contact with the compartment boundaries define plural ballast compartments internal to the wall means. The ballast compartments are in communication with each other. A combination fill and drain valve in the flexible top wall is provided for filling the ballast compartments with a water and for emptying the water from the ballast compartments.

10 Claims, 3 Drawing Sheets

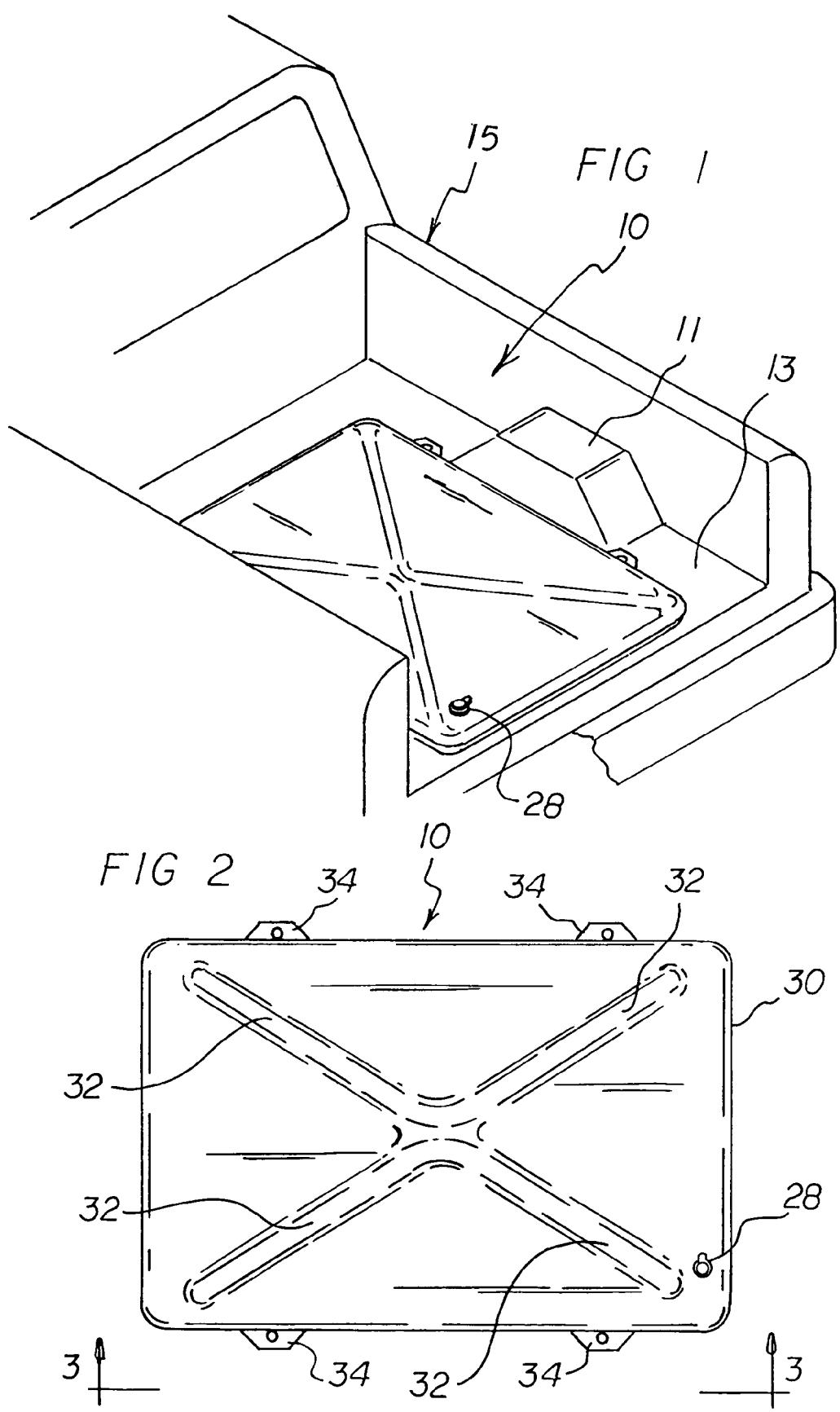

FIG 3
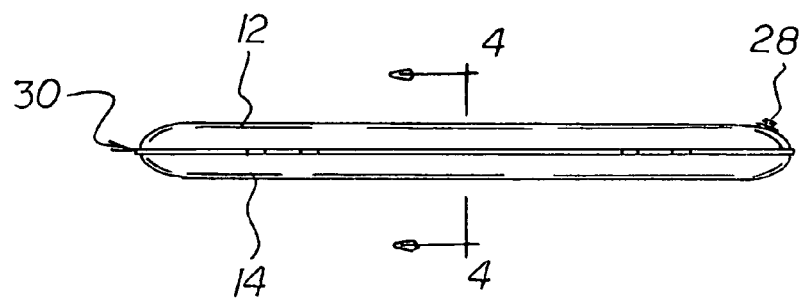
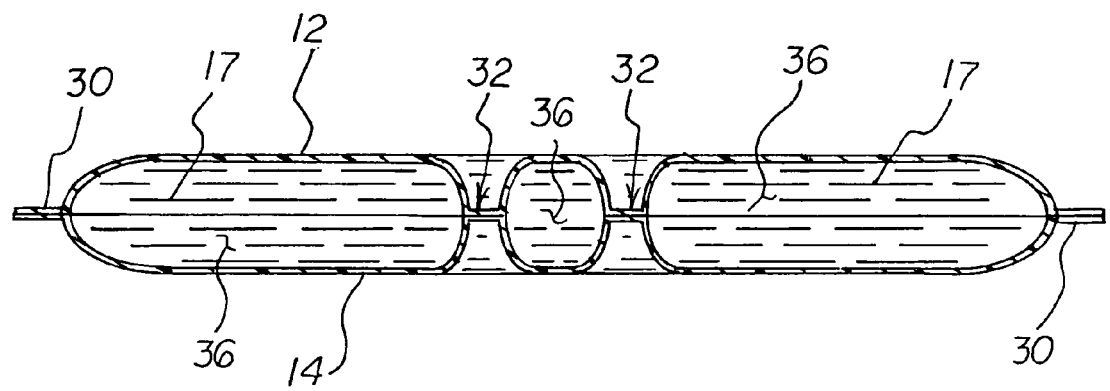
FIG 4

VEHICLE BED LINER APPARATUS CONTAINING A COMPARTMENTED BALLAST CHAMBER

CROSS-REFERENCE TO RELATED APPLICATION

This application claims priority based upon my copending Provisional Application Ser. No. 60/434,225; filed Dec. 17, 2002.

BACKGROUND OF THE INVENTION

1. Field of the Invention

The present invention relates generally to liners for beds of vehicles, such as beds of pickup trucks and, more particularly, to a vehicle truck bed liner especially adapted for taking on a ballast material for adding weight to the bed of the vehicle.

2. Description of the Prior Art

Every winter, and during slippery road conditions generally, pickup truck users are faced with a dilemma in adding weight to the bed of the pickup truck to increase friction between the drive wheels and the road. Weighty items that are not secured to the bed of the pickup truck can be used. Such weighty items include sandbags, wood chucks, and concrete blocks. Snow can also be added to the bed of the pickup truck. The sandbags, wood chucks, and concrete blocks can move around in the pickup truck bed. In doing so, they can bump into and damage other objects being hauled in the bed of the pickup truck. In addition, such weighty items take up carry space, preventing other objects from being hauled. Moreover, the sandbags, wood chucks, and concrete blocks can have safety concerns. In case of an accident, they can act as dangerous projectiles. In this respect, it would be desirable if weight that is added to the bed of a pickup truck be secured to the bed of the pickup truck and take up a minimal amount of haulage space in the pickup truck bed.

In U.S. Pat. No. 4,796,914 of Raynor, a liner for the bed of a pickup truck is disclosed which includes a ballast chamber for receiving liquid ballast, such as water or a water/antifreeze mixture. The Raynor patent discloses that vertically oriented support column members 30 space a top wall from a bottom wall of the liner. Moreover, side walls and end walls are also required. The required walls of the Raynor patent provide a three dimensional liner which has a fixed three dimensional volume. As a result, the haulage volume of the pickup truck bed is reduced by the fixed three dimensional volume of the liner. Even when the ballast is not needed in the liner, the three dimensional volume of the liner remains fixed. In this respect, it would be desirable if a vehicle bed liner were provided which does not have a fixed three dimensional volume even when ballast is not added to the liner.

As mentioned above, the Raynor patent provides a plurality of vertically oriented support column members 30 between the top and bottom liner layers. It is quite a complicated manufacturing operation to provide such a plurality of vertically oriented support column members between the top and bottom layers. To provide for simplicity and economy in manufacture, it would be desirable if a vehicle bed liner were provided which does not include a plurality of vertically oriented support column members between the top and bottom liner layers.

The ballast chamber in the Raynor patent is, in essence, one large-volume ballast chamber. As a result, when the pickup truck accelerates, decelerates, and goes around turns, there is a significant hydraulic thrust and movement of the liquid ballast material inside the ballast chamber. Such movement of the liquid ballast material is undesirable in that it can precipitate a shifting of the load on top of the liner, thereby causing instability to the pickup truck. Moreover, the movement of the liquid ballast material itself can contribute to instability of the pickup truck. In this respect, it would be desirable if a vehicle bed liner were provided which inhibited liquid ballast material from moving inside the liner when the pickup truck accelerates, decelerates, and goes around turns.

It is noted that the Raynor patent discloses a vehicle bed liner that fits snugly around the wheel wells projecting into the bed. Other than the snug fit, provisions are not made in the Raynor patent to secure the liner to the bed. Sizes and shapes of wheel wells may vary from one pickup truck to another. Consequently, it would be not be possible to provide a "one size fits all" type of liner when securing of the liner to bed depended upon the snugness of fit between the liner and the wheel wells. In this respect, it would be desirable if a vehicle bed liner were provided with means to secure the liner to the bed of the pickup truck which does not depend upon the snugness of the fit between the liner and the wheel wells.

Still other features would be desirable in a vehicle bed liner apparatus. It is known that when liquid water freezes into solid ice, the ice has a greater volume than the liquid. The expansion of the ice can cause an inflexible container to rupture. In this respect, it would be desirable if a vehicle bed liner were provided which does not rupture when liquid water freezes therein to become solid ice.

Thus, while the foregoing body of prior art indicates it to be well known to use a vehicle bed liner that has a ballast chamber, the prior art described above does not teach or suggest a flexible vehicle bed liner apparatus containing a ballast chamber which has the following combination of desirable features: (1) can be secured to the bed of the pickup truck and take up a minimal amount of haulage space in the pickup truck bed; (2) does not have a fixed three dimensional volume even when ballast is not added to the liner; (3) does not include a plurality of vertically oriented support column members between the top and bottom liner layers; (4) inhibits liquid ballast material from moving inside the liner when the pickup truck accelerates, decelerates, and goes around turns; (5) includes means to secure the flexible liner to the bed of the pickup truck which does not depend upon the snugness of the fit between the liner and the wheel wells; and (6) does not rupture when liquid water freezes therein to become solid ice. The foregoing desired characteristics are provided by the unique vehicle bed liner apparatus containing a flexible compartmented ballast chamber of the present invention as will be made apparent from the following description thereof. Other advantages of the present invention over the prior art also will be rendered evident.

SUMMARY OF THE INVENTION

To achieve the foregoing and other advantages, the present invention, briefly described, provides a vehicle bed liner apparatus which includes flexible wall means for containing a quantity of ballast liquid. The flexible wall means include a flexible top wall, a flexible bottom wall, and a peripheral sealed region between the top wall and the bottom wall. Compartment boundary means are located at plural internal non-peripheral regions between the flexible top wall and the flexible bottom wall. The compartment boundary means are in contact with the flexible top wall and the flexible bottom wall. The compartment boundary means define internal compartment boundaries. The plural non-peripheral compartment boundaries and plural internal non-peripheral regions between the flexible top wall and the flexible bottom wall that are not in contact with the compartment boundaries define plural ballast compartments internal to the wall means. The ballast compartments are in communication with each other. Interior access valve means in the flexible wall means are provided for filling the ballast compartments with a ballast liquid and for emptying the ballast liquid from the ballast compartments.

Preferably, the compartment boundary means include plural internal sealed regions between plural non-peripheral sealed portions of the flexible top wall and the flexible bottom wall. The plural internal sealed non-peripheral regions define internal sealed compartment boundaries. The plural non-peripheral compartment boundaries and plural internal unsealed non-peripheral regions between the flexible top wall and the flexible bottom wall define the plural ballast compartments.

Preferably, each of the flexible top wall and the flexible bottom wall includes a double-layer, mesh-reinforced top outer liner and a single-layer inner liner. In this respect, the double-layer, mesh-reinforced top outer liner may includes an inside flexible nylon mesh layer sandwiched between and a top layer of flexible vinyl liner material and a bottom layer of flexible liner material.

Alternatively, each of the flexible top wall and the flexible bottom wall can be comprised of respective single-layer outer protective liner and a single-layer inner liner.

Preferably, the interior access valve means include a combination fill and drain valve.

Preferably, the compartment boundaries and the peripheral sealed region between the top wall and the bottom wall (the peripheral seal) are formed by radio frequency (RF) welding between the top wall and the bottom wall. The compartment boundaries can have an X-shaped appearance from above the flexible wall means.

In accordance with its most broad aspect, the liner apparatus of the present invention forms a flexible, ballast containing mat or bladder suitably dimensioned to lie flat on the bed of a vehicle such as a pick-up truck, and preferably between the wheel wells thereof. When use thereof is not desired, the ballast may be removed from the apparatus, and the flexible mat or bladder rolled-up or folded for convenient storage.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining the preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved vehicle bed liner apparatus containing a compartmented ballast chamber which has all of the advantages of the prior art and none of the disadvantages.

It is another object of the present invention to provide a new and improved vehicle bed liner apparatus containing a compartmented ballast chamber which may be easily and efficiently manufactured and marketed.

It is a further object of the present invention to provide a new and improved vehicle bed liner apparatus containing a compartmented ballast chamber which is of durable and reliable construction.

An even further object of the present invention is to provide a new and improved vehicle bed liner apparatus containing a compartmented ballast chamber which is susceptible of a low cost of manufacture with regard to both materials and labor, and which accordingly is then susceptible of low prices of sale to the consuming public, thereby making such vehicle bed liner apparatus containing a compartmented ballast chamber available to the buying public.

Still yet a further object of the present invention is to provide a new and improved vehicle bed liner apparatus containing a compartmented ballast chamber which can be secured to the bed of the pickup truck and take up a minimal amount of haulage space in the pickup truck bed.

Still another object of the present invention is to provide a new and improved vehicle bed liner apparatus containing a compartmented ballast chamber that does not have a fixed three dimensional volume even when ballast is not added to the liner.

Yet another object of the present invention is to provide a new and improved vehicle bed liner apparatus containing a compartmented ballast chamber which does not include a plurality of vertically oriented support column members between the top and bottom liner layers.

Even another object of the present invention is to provide a new and improved vehicle bed liner apparatus containing a compartmented ballast chamber that inhibits liquid ballast material from moving inside the liner when the pickup truck accelerates, decelerates, and goes around turns.

Still a further object of the present invention is to provide a new and improved vehicle bed liner apparatus containing a compartmented ballast chamber which includes means to secure the liner to the bed of the pickup truck which does not depend upon the snugness of the fit between the liner and the wheel wells.

Yet another object of the present invention is to provide a new and improved vehicle bed liner apparatus containing a compartmented ballast chamber that does not rupture when liquid water freezes therein to become solid ice.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view of a vehicle bed liner apparatus containing a compartmented ballast chamber of the invention installed on a pickup truck bed.

FIG. 2 is a top view of the embodiment of the invention shown in FIG. 1, removed from the pickup truck bed.

FIG. 3 is a side view of the embodiment of the invention shown in FIG. 2 taken along line 3—3 thereof.

FIG. 4 is an enlarged cross-sectional view of the embodiment of the invention shown in FIG. 3 taken along line 4—4 thereof.

DESCRIPTION OF THE PREFERRED EMBODIMENT

Figure 5:
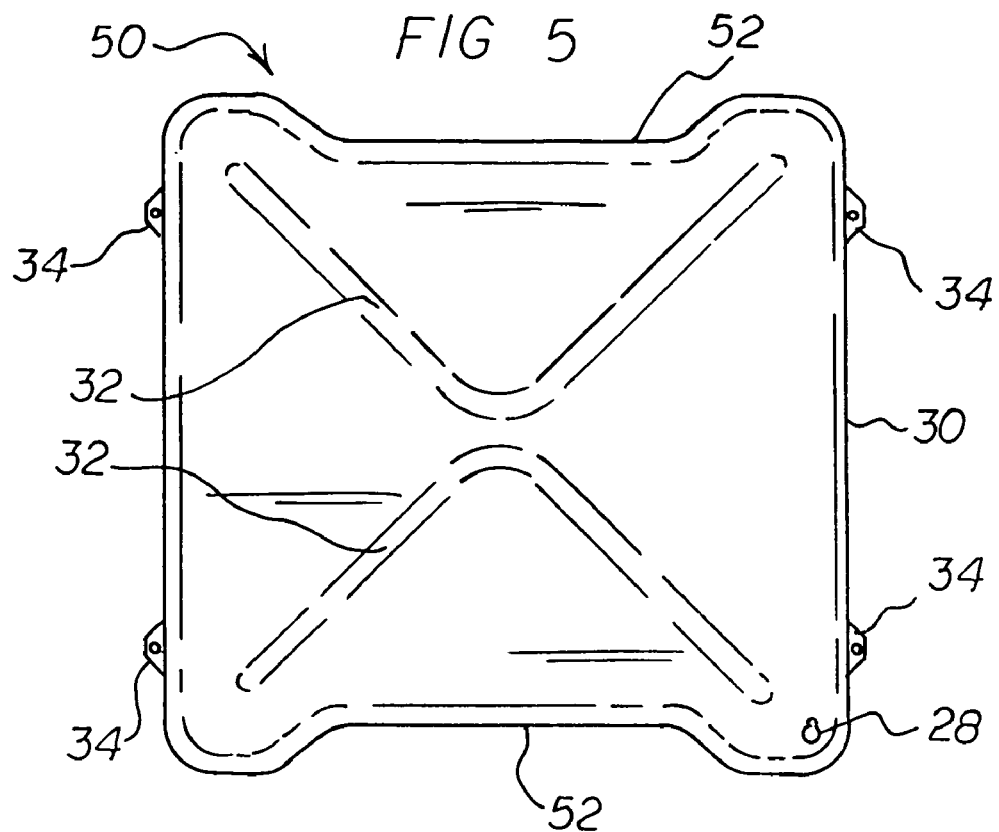
FIG. 5 is a top view of a second embodiment of the invention which has indented side regions to accommodate a pair of wheel wells.

With reference to the drawings, a new and improved vehicle bed liner apparatus containing a compartmented ballast chamber embodying the principles and concepts of the present invention will be described.

Turning to FIGS. 1–4, there is shown a first embodiment of the vehicle bed liner apparatus comprising a compartmented ballast chamber of the invention generally designated by reference numeral 10. In accordance with its most broad aspect, apparatus 10 defines a flexible, ballast containing mat or bladder suitably dimensioned to lie flat on the bed of a vehicle such as a pick-up truck, and preferably between the wheel wells thereof. When use thereof is not desired, the ballast may be removed from the apparatus, and the flexible mat or bladder rolled-up or folded for convenient storage.

In the first embodiment, the compartmented ballast chamber 10 includes flexible wall means for containing a quantity of ballast liquid 17. The flexible wall means include a flexible top wall 12, a flexible bottom wall 14, and a peripheral sealed region between the top wall 12 and the bottom wall 14. Compartment boundary means are located at plural internal non-peripheral regions between the flexible top wall 12 and the flexible bottom wall 14. The compartment boundary means are in contact with the flexible top wall 12 and the flexible bottom wall 14. The compartment boundary means define internal compartment boundaries 32. The plural non-peripheral compartment boundaries 32 and plural internal non-peripheral regions between the flexible top wall 12 and the flexible bottom wall 14 that are not in contact with the compartment boundaries 32 define plural ballast compartments 36 internal to the wall means. The ballast compartments 36 are in communication with each other. Interior access valve means in the flexible wall means are provided for filling the ballast compartments 36 with a ballast liquid 17 and for emptying the ballast liquid 17 from the ballast compartments 36.

Preferably, the compartment boundary means include plural internal sealed regions between plural non-peripheral sealed portions of the flexible top wall 12 and the flexible bottom wall 14. The plural internal sealed non-peripheral regions define internal sealed compartment boundaries 32. The plural non-peripheral compartment boundaries 32 and plural internal unsealed non-peripheral regions between the flexible top wall 12 and the flexible bottom wall 14 define the plural ballast compartments 36.

Alternatively, if desired, the compartment boundary means can be in a form of a sponge-like material at internal non-peripheral regions between the flexible top wall 12 and the flexible bottom wall 14.

Alternatively, if desired, each of the flexible top wall 12 and the flexible bottom wall 14 may include a double-layer, mesh-reinforced top outer liner and a single-layer inner liner. In this respect, the double-layer, mesh-reinforced top outer liner may include an inside flexible nylon mesh layer sandwiched between and a top layer of flexible vinyl liner material and a bottom layer of flexible liner material. In this respect, the double-layer, mesh-reinforced top outer liner is made from very tough rot, mildew, and tear resistant material. Such material is rated to withstand outdoor temperatures as low as −40 degrees Fahrenheit (actual degrees, not windchill).

Alternatively, each of the flexible top wall 12 and the flexible bottom wall 14 can be comprised of respective single-layer outer protective liner and a single-layer inner liner.

Preferably, the interior access valve means include a combination fill and drain valve 28. Alternatively, the interior access valve means can include one valve for filling and another valve for draining.

Preferably, the compartment boundaries 32 and the peripheral sealed region between the top wall 12 and the bottom wall 14 (the peripheral seal 30) are formed by radio frequency (RF) welding between the top wall and the bottom wall. The compartment boundaries 32 can have an X-shaped appearance from above the flexible wall means.

To use the first embodiment of the vehicle bed liner apparatus 10 of the invention, substantially as shown in FIG. 1, the vehicle bed liner apparatus 10 is placed to lie essentially flat on the pickup truck bed 13 between the wheel wells thereof. The combination fill and drain valve 28 is opened, and a quantity of ballast liquid 17 is added through to the ballast compartment in direct communication with the combination fill and drain valve 28. Inside the apparatus, all of the ballast compartments 36 are in communication, so that as the ballast liquid 17 is added to the first ballast compartments 36, the added ballast liquid 17 flows into all of the ballast compartments 36.

Generally, the weight of the ballast liquid 17, which is preferably water, is heavy enough to keep the vehicle bed liner apparatus 10 in position on the pickup truck bed 13. In this respect, the vehicle bed liner apparatus 10 of the invention is easily installed on the pickup truck bed 13, simply by placing the vehicle bed liner apparatus 10 on the pickup truck bed 13 and adding water.

More specifically, water weighs approximately 8 lbs. per gallon. With particular embodiments of the invention already available, the LW-0036 model has a ballast weight of lbs. The LW-0048 model has a ballast weight of 270 lbs. The LW-0056 model has a ballast weight of 340 lbs. In this respect, the LW-0056 can provide up to 340 lbs. in the pickup truck bed 13 to provide added traction. However, more or less ballast weight can be added or subtracted because each model can operate with a fill level ranging from 1 to 6 inches without harming the apparatus.

Even more specifically, a vehicle bed liner apparatus 10 can have the following dimensions. The length can be 8 ft., the width can be 4 ft., and the height can be 2 in. For such an apparatus, the total internal volume is 9,216 cubic inches. Such an apparatus could hold 39.89 gallons of water. Since water weighs approximately 8 lbs. per gallon, such a ballast weight would be approximately 320 lbs. Adding water to a height greater than 2 inches would increase the ballast weight, and reducing the height of water would decrease the ballast weight. An important point is not to add water to exceed the capacity of the apparatus to expand if the liquid water freezes to expand to solid ice inside the apparatus. In general, there is no worry that the vehicle bed liner apparatus 10 will be harmed by freezing water. The vehicle bed liner apparatus 10 simply expands when the liquid water freezes into expanded solid ice. If desired, a conventional winterizing liquid (e.g. anti-freeze compound) may be added to the water to prevent freezing and solidifying of the water.

The materials composing the flexible top wall 12 and the flexible bottom wall 14 are tough an durable and generally serve as a support platform or member for a wide range of cargo. With the vehicle bed liner apparatus 10 containing a load of ballast liquid 17, the flexible top wall 12, the flexible bottom wall 14, and the internal sealed compartment boundaries 32 are rated to withstand up to 500 lbs. of cargo. It is understood that the cargo should have a substantially flat bottom(s). Cargo that has sharp points at the bottom may damage the vehicle bed liner apparatus 10 of the invention.

It is noted that the compartment boundary means inside the vehicle bed liner apparatus 10 provide baffles which inhibit hydraulic thrust from the ballast liquid 17 moving inside the vehicle bed liner apparatus 10 when the pickup truck accelerates, decelerates, and goes around turns.

If after the vehicle bed liner apparatus 10 has been drained and is empty, and if it is desired, tie down straps or bolt fastenings can be used with the grommets 34 of the vehicle bed liner apparatus 10 to secure the vehicle bed liner apparatus 10 to the pickup truck 15.

A group of vehicle bed liner apparatuses 10 of the invention are sold under the Trademark "ShurTrax" and are available from SealPak Innovations, Ltd., 75 Barleycorn Drive, Sunbury, Ohio 43074, which is also on the Internet at www.sealpakinnovations.com.

More specifically, here are directions for using a "ShurTrax" vehicle bed liner apparatus 10 of the invention.
1. Ensure that the vehicle is in Park, and the emergency brake is set.
2. Lay the "ShurTrax" liner apparatus out in the vehicle with any decal facing up. It is noted that a company's logo or other decal can be silkscreened onto the top surface of the "ShurTrax".
3. Open the combination fill and drain valve and begin filling with a garden hose. A so-called "Perfect Union" fitting (available from SealPak Innovations, Ltd.) will assist in preventing water spillage.
4. Do not overfill with water. The recommended fill level is 3 inches. If 3 inches is exceeded during filling, the "ShurTrax" liner apparatus should be burped (pressed) to remove excess water and air. There must be room for expansion of ice when outside temperature drops below 32 degrees Fahrenheit.
5. Once the "ShurTrax" liner is filled, ensure that the combination fill and drain valve is completely closed.
6. Secure the "ShurTrax" liner apparatus to the bed of the vehicle, if desired, by using cables or hardware and anchor from the four grommets to the vehicle. Cables and/or anchoring hardware are not included.

To drain the "ShurTrax" liner, ensure that the vehicle is in Park, and the emergency brake is set. Open the combination fill and drain valve. If the vehicle is on level ground, press on the top section of the "ShurTrax" (next to the cab) to force water out from the combination fill and drain valve. A "Super Siphon" (a siphon pump available from SealPak Innovations, Ltd.) may be employed to aid in draining the "ShurTrax" liner apparatus. If the vehicle is on an uphill grade, with the vehicle bed is tilted downhill, water will be forced out from the "ShurTrax" liner by gravity.

The "ShurTrax" liner apparatus, if cut or punctured, can be repaired with a patch kit.

It is noted, that when the vehicle bed liner apparatus 10 is not needed for use, it can be drained of its ballast liquid 17 and rolled up into a conveniently stored rolled up mode.

It is noted that the above description has discussed the vehicle bed liner apparatus 10 as literally being used in a vehicle bed. However, the apparatus of the invention can also be used in the trunks of automobiles and in the storage areas of station wagons and SUV's.

Turning to FIG. 5, a second embodiment of the invention 50 is shown. Reference numerals are shown that correspond to like reference numerals that designate like elements shown in the other figures. In addition, the second embodiment of the invention 50 includes indented side regions 52 which fit around wheel wells 11 in a pickup truck bed 13.

Figure 6:
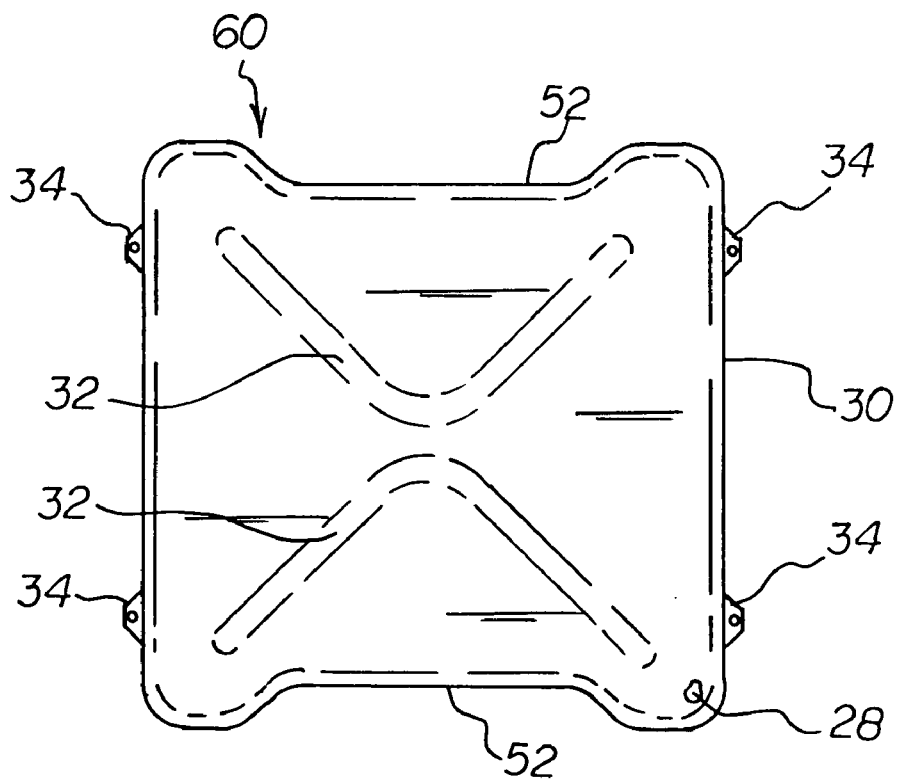
FIG. 6 is a top view of a third embodiment of the invention which has indented side regions to accommodate a pair of wheel wells and which is smaller than the embodiment of the invention shown in FIG. 5.

Turning to FIG. 6, a third embodiment of the invention 60 is shown. Reference numerals are shown that correspond to like reference numerals that designate like elements shown in the other figures. In addition, the third embodiment of the invention 60 also includes the indented side regions 52 for the wheel wells 11. It is noted that the third embodiment of the invention 60 is smaller than the second embodiment of the invention 50. In this respect, the vehicle bed liner apparatus 10 can be made in any suitable size.

The components of the vehicle bed liner apparatus containing a compartmented ballast chamber of the invention can be made from inexpensive and durable rubber and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved vehicle bed liner apparatus in the form of a flexible mat or bladder that comprises a compartmented ballast chamber that is low in cost, relatively simple in design and operation, and which may advantageously be used to be secured to the bed of the pickup truck and take up a minimal amount of haulage space in the pickup truck bed. With the invention, a vehicle bed liner apparatus containing a compartmented ballast chamber is provided which does not have a fixed three dimensional volume even when ballast is not added to the liner. With the invention, a vehicle bed liner apparatus containing a compartmented ballast chamber is provided which does not include a plurality of vertically oriented support column members between the top and bottom liner layers. With the invention, a vehicle bed liner apparatus containing a compartmented ballast chamber is provided which inhibits liquid ballast material from moving inside the liner when the pickup truck accelerates, decelerates, and goes around turns. With the invention, a vehicle bed liner apparatus containing a compartmented ballast chamber is provided which includes means to secure the liner to the bed of the pickup truck which does not depend upon the snugness of the fit between the liner and the wheel wells. With the invention, a vehicle bed liner apparatus containing a compartmented ballast chamber is provided which does not rupture when liquid water freezes therein to become solid ice. With the invention, a vehicle bed liner apparatus containing a compartmented ballast chamber is provided which serves the dual purpose of a flexible support for cargo.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected to by Letters Patent of the United States is as follows:

1. A vehicle bed liner apparatus, comprising:
    a flexible walled container for containing a quantity of ballast liquid, wherein said flexible walled container includes a flexible top wall, a flexible bottom wall, and a seal extending along the periphery of said container between said top wall and said bottom wall,
    a pair of compartment boundary members located at internal non-peripheral regions between said flexible top wall and said flexible bottom wall, wherein said compartment boundary members are in contact with said flexible top wall and said flexible bottom wall, wherein said compartment boundary members define internal compartment boundaries, said pair of internal compartment members each terminating in a distal extremity spaced inwardly from said peripheral seal to define a passageway extending internally of said container common with said peripheral seal, wherein said pair of compartment boundary members have an X-shaped appearance from above said flexible walled container, wherein said X-shaped said compartment boundary members define plural ballast compartments internal to said flexible walled container in communication with said passageway extending internally of said container common with said peripheral seal, and wherein said ballast compartments are in communication with each other through a central passageway defined by and extending between said pair of internal compartment boundary members, and
    interior access valve means in said flexible walled container for filling said ballast compartments with a ballast liquid and for emptying the ballast liquid from said ballast compartments.

2. The apparatus of claim 1 wherein each of said flexible top wall and said flexible bottom wall includes a single-layer outer liner and a single-layer inner liner.

3. The apparatus of claim 1 wherein each of said flexible top wall and said flexible bottom wall includes a double-layer, mesh-reinforced top outer liner and a single-layer inner liner.

4. The apparatus of claim 3 wherein said double-layer, mesh-reinforced top outer liner includes an inside flexible nylon mesh layer sandwiched between and a top layer of flexible vinyl liner material and a bottom layer of flexible liner material.

5. The apparatus of claim 1 wherein said interior access valve means is a combination fill and drain valve.

6. The apparatus of claim 1 wherein said seal extending along the periphery of said container between said top wall and said bottom wall is formed by radio frequency (RF) welding between said top wall and said bottom wall.

7. A combined cargo support and ballast apparatus for a vehicle having a truck bed including a floor and opposed side walls defining a pair of opposed wheel wells, respectively, said apparatus comprising: a flexible, hollow, substantially rectangular-shaped bladder, and a valve assembly for admitting a ballast liquid into the hollow interior of said bladder, wherein said flexible, hollow, substantially rectangular-shaped bladder is suitably dimensioned to lie flat on said truck bed between said pair of opposed wheel wells, said flexible, hollow, substantially rectangular-shaped bladder being formed from a top wall and a bottom wall sealed together along its peripheral edge, and wherein said flexible, hollow, substantially rectangular-shaped bladder has an X-shaped internal partition formed by welding together first portions of said top wall and said bottom wall to form a first half of said X-shaped internal partition, and by welding together second portions of said top wall and said bottom wall to form a second half of said X-shaped partition, and wherein ballast compartments formed by said X-shaped internal partition are in communication with each other through a central passageway defined by and extending between said first half and said second half of said X-shaped internal partition.

8. The apparatus of claim 7 wherein said flexible, hollow, substantially rectangular-shaped bladder has a flexible top wall and a substantially coextensive flexible bottom wall and said flexible top wall and said flexible bottom wall are sealed together along their corresponding peripheral edges.

9. The apparatus of claim 7 wherein said bladder is fabricated of material that expands upon the freezing of the ballast liquid contained therein.

10. The apparatus of claim 9 wherein said bladder has a top wall and a bottom wall, and at least said top wall of said bladder is covered by a protective layer.

* * * * *